(12) United States Patent
Klug et al.

(10) Patent No.: US 12,325,349 B2
(45) Date of Patent: Jun. 10, 2025

(54) EXTERNAL LIGHTING DEVICE FOR A MOTOR VEHICLE

(71) Applicant: AUDI AG, Ingolstadt (DE)

(72) Inventors: Markus Klug, Ingolstadt (DE); Tobias Moll, Ingolstadt (DE); Johannes Scheuchenpflug, Baar-Ebenhausen (DE)

(73) Assignee: AUDI AG, Ingolstadt (DE)

(*) Notice: Subject to any disclaimer, the term of this patent is extended or adjusted under 35 U.S.C. 154(b) by 300 days.

(21) Appl. No.: 17/608,245

(22) PCT Filed: Apr. 30, 2020

(86) PCT No.: PCT/EP2020/062113
§ 371 (c)(1),
(2) Date: Nov. 2, 2021

(87) PCT Pub. No.: WO2020/225123
PCT Pub. Date: Nov. 12, 2020

(65) Prior Publication Data
US 2022/0203882 A1    Jun. 30, 2022

(30) Foreign Application Priority Data

May 3, 2019    (DE) .................. 10 2019 206 370.5

(51) Int. Cl.
*B60Q 1/00*    (2006.01)
*F21S 41/24*    (2018.01)
(Continued)

(52) U.S. Cl.
CPC ............ *B60Q 1/0023* (2013.01); *F21S 41/24* (2018.01); *F21S 41/60* (2018.01); *G01S 7/4811* (2013.01);
(Continued)

(58) Field of Classification Search
CPC .. G02B 6/0095; G02B 6/0016; G02B 5/1866; G02B 5/32; G02B 6/0026; G02B 6/005;
(Continued)

(56) References Cited

U.S. PATENT DOCUMENTS 5,268,985 A    12/1993  Ando et al.
2008/0225393 A1    9/2008  Rinko
(Continued)

FOREIGN PATENT DOCUMENTS

CN              104033817 A  *  9/2014  ............. F21S 43/14
DE     10 2005 055 123 A1        5/2006
(Continued)

OTHER PUBLICATIONS

International Search Report dated Jul. 20, 2020 for International Application No. PCT/EP2020/062113.
(Continued)

*Primary Examiner* — Thai Q Tran
*Assistant Examiner* — Nienru Yang
(74) *Attorney, Agent, or Firm* — STAAS & HALSEY LLP

(57) ABSTRACT

A design screen and at least one detection device with an image capturing device and a carrier medium are provided in an external lighting device for a motor vehicle. The carrier medium is a flat waveguide on which a coupling region and a decoupling region are provided. The carrier medium is adapted to the surface shape of the design screen. The coupling region and the decoupling region are each a holographic element. Light incident on the external lighting device from the surroundings is coupled into the carrier medium via the coupling region, is transported to the decoupling region by internal reflection in the waveguide, and is decoupled at the decoupling region. The image capturing
(Continued)

device detects the decoupled light and provides image data which correlates to the detected light.

18 Claims, 4 Drawing Sheets

(51) Int. Cl.
| | |
|---|---|
| *F21S 41/60* | (2018.01) |
| *F21V 8/00* | (2006.01) |
| *G01S 7/481* | (2006.01) |
| *G01S 17/10* | (2020.01) |
| *G01S 17/89* | (2020.01) |
| *G02B 5/32* | (2006.01) |
| *G06V 20/58* | (2022.01) |
| *H04N 23/57* | (2023.01) |
| *H04N 23/90* | (2023.01) |
| *F21W 102/13* | (2018.01) |

(52) U.S. Cl.
CPC .............. *G01S 17/10* (2013.01); *G01S 17/89* (2013.01); *G02B 5/32* (2013.01); *G02B 6/0026* (2013.01); *G02B 6/005* (2013.01); *G06V 20/584* (2022.01); *H04N 23/57* (2023.01); *H04N 23/90* (2023.01); *F21W 2102/13* (2018.01); *G06V 2201/08* (2022.01)

(58) Field of Classification Search
CPC .......... F21S 41/24; F21S 41/60; H04N 23/90; H04N 23/57; G01S 17/10; G01S 7/4813; G01S 7/4811; G01S 17/89; G01S 17/931; G03H 1/0252; G03H 1/0005; G03H 2222/33; G03H 2223/16; G03H 2001/264; G03H 2001/0212; G03H 2270/21; G06V 20/58; G06V 20/584; G06V 2201/08; B60Q 1/0023; B60R 11/04; F21W 2102/13
USPC .......................................................... 348/148
See application file for complete search history.

(56) References Cited

U.S. PATENT DOCUMENTS

| | | | |
|---|---|---|---|
| 2015/0023602 A1 | 1/2015 | Wnuk et al. | |
| 2016/0110621 A1 | 4/2016 | Tsimhoni et al. | |
| 2017/0307797 A1 | 10/2017 | Wierich | |
| 2018/0046859 A1 | 2/2018 | Jarvenpaa | |
| 2018/0334108 A1* | 11/2018 | Rötzer | G03B 37/04 |
| 2019/0041634 A1 | 2/2019 | Popovich et al. | |
| 2019/0049736 A1 | 2/2019 | Tanriover et al. | |
| 2019/0353898 A1 | 11/2019 | Amirsolaimani et al. | |

FOREIGN PATENT DOCUMENTS

| | | | | |
|---|---|---|---|---|
| DE | 10 2009 010 904 A1 | 9/2010 | | |
| DE | 10 2012 004 817 A1 | 9/2013 | | |
| DE | 102016013510 A1 * | 10/2017 | ............... | B60Q 1/04 |
| DE | 10 2016 211 823 A1 | 1/2018 | | |
| DE | 102016115938 A1 * | 3/2018 | ......... | G02B 27/0081 |
| DE | 10 2017 001 505 A1 | 8/2018 | | |
| DE | 10 2017 201 707 A1 | 8/2018 | | |
| DE | 10 2017 109 905 A1 | 11/2018 | | |
| DE | 10 2017 217 193 A1 | 3/2019 | | |
| DE | 10 2019 206 370.5 | 5/2019 | | |
| EP | 1 312 936 A2 | 5/2003 | | |
| FR | 2 799 272 A1 | 4/2001 | | |
| KR | 10-2014-0001268 A | 1/2014 | | |
| KR | 20160049767 A * | 10/2016 | ............... | B60Q 1/04 |
| WO | 00/50267 A1 | 8/2000 | | |
| WO | WO 2012/055950 A1 | 5/2012 | | |
| WO | PCT/EP2020/062113 | 4/2020 | | |

OTHER PUBLICATIONS

German Office Action dated Apr. 3, 2020 from German Application No. 2019 206 370.5.
Translation by WIPO of International Preliminary Report on Patentability for PCT/EP2020/062113, mailed Jul. 20, 2020, 6 pp.
S.C. Barden et al., "Volume-phase holographic gratings and their potential for astronomical applications", Proceedings SPIE, vol. 3355, "Optical Astronomical Instrumentation", 1998, pp. 866-876.
U.S. Non-Final Office Action issued in co-pending U.S. Appl. No. 17/608,382 dated Feb. 27, 2024.
Bleda, Sergio et al. "Study of the imaging characteristics of holographic waveguides," Proc. of SPIE, vol. 11030, 1103013 (2019) (17 pages).
International Search Report for International Application No. PCT/EP2020/062107 dated Jul. 27, 2020 (19 pages with translation).
International Preliminary Report on Patentability and Written Opinion in International Application No. PCT/EP2020/062107 dated Nov. 2, 2021 (8 pages).
Germany Examination Report dated Dec. 9, 2020, for German Application No. 10 2019 206 377.2 (10 pages).
European Notice to Grant issued in parallel European Application No. 20 725 102.6 dated Oct. 31, 2023.
U.S. Appl. No. 17/608,382, filed Nov. 2, 2021, Markus Klug, Audi.
Chinese Notice of Allowance issued in counterpart Chinese Application No. 202080033220.8 dated Apr. 24, 2024.

* cited by examiner

EXTERNAL LIGHTING DEVICE FOR A MOTOR VEHICLE

CROSS REFERENCE TO RELATED APPLICATIONS

This application is a U.S. national stage of International Application No. PCT/EP2020/062113, filed on Apr. 30, 2020. The International Application claims the priority benefit of German Application No. 10 2019 206 370.5 filed on May 3, 2019. Both the International Application and the German Application are incorporated by reference herein in their entirety.

BACKGROUND

Described below is an external lighting device for a motor vehicle having a design screen and at least one capturing device with an image capturing device and a carrier medium. Also described is a motor vehicle with such an external lighting device.

A motor vehicle often has a camera system configured to capture the surroundings of the motor vehicle at least almost completely, that is to say to afford an all-round view around the motor vehicle. For this purpose, for example, corresponding camera sensors are installed centrally in the front region and in a rear region of the motor vehicle. However, not all of the exterior components of the motor vehicle are suitable for allowing such camera sensors to be positioned there. For example, various restrictions arise with regard to positioning on account of a locally limited availability of structural space, a high probability of contamination, for example owing to puddle water splashing up, or an optical restriction associated with positioning with regard to the surroundings that can be captured from there. The camera sensors are therefore often arranged at predefined positions, such as centrally in the front region, in the rear region and/or on the side mirrors of the motor vehicle. Only restricted use of conventional camera systems is thus possible with regard to positioning on the motor vehicle.

The related art discloses optical diffraction gratings that are produced holographically and are therefore referred to as holographic gratings. In this regard, the scientific publication "Volume-phase holographic gratings and their potential for astronomical applications" (S. C. Barden, J. A. Arns and W. S. Colburn, Proceedings SPIE 3355, Optical Astronomical Instrumentation, 1998) discloses the fact that light which impinges on such a holographic grating at an angle that is distinctly outside the angular range that satisfies the Bragg condition passes through the holographic grating without being diffracted. However if light impinges on the holographic grating from an angle so that the Bragg condition is at least approximately satisfied, the light is diffracted at an angle. A similar behavior is manifested with regard to a wavelength dependence of the influence of the holographic grating on light. This is because light having a wavelength that lies distinctly outside the wavelength range that is predefined by the Bragg condition as the so-called Bragg wavelength likewise passes through the holographic grating without being diffracted and only light having a wavelength that at least approximately satisfies the Bragg condition is diffracted at the holographic grating. Using complex holographic grating structures it is possible for light with two different wavelength ranges to be diffracted at the same angle in each case. Moreover, for example, a holographic grating can split light having different wavelengths into different light paths, such that a dispersive beam splitter can be realized with the aid of a holographic grating.

SUMMARY

Described below is a camera system for a motor vehicle which can be integrated into the motor vehicle in an inconspicuous way.

The external lighting device for a motor vehicle is designed overall to provide image data that correlate with the captured light. The external lighting device for a motor vehicle thus ultimately enables the surroundings of the motor vehicle to be captured photographically and/or in a video-based manner. The external lighting device is embodied for example as a front headlight, a rear light, a vehicle indicator light or a brake light. The external lighting device has a design screen and at least one capturing device. The design screen is produced from plastic, for example, and serves to cover a lighting unit of the external lighting device, that is to say a lamp, embodied as a light-emitting diode (LED), for example, toward the surroundings of the motor vehicle. The design screen can be designed for example in colored fashion, for example in red in the case of the brake light.

The capturing device of the external lighting device is designed to provide the image data of the surroundings. For this purpose, firstly an image capturing device and secondly a carrier medium are used. The carrier medium is embodied as a light guide on which an input coupling region and an output coupling region are provided. The carrier medium thus constitutes a light guiding medium. The carrier medium can be embodied in planar fashion, for example, that is to say that a width and a length of the carrier medium are greater than a thickness of the carrier medium. This planar carrier medium is secured perpendicularly on the thickness of the carrier medium for example on the design screen. For this purpose, the carrier medium can be produced for example as a plate or film composed of transparent plastic or glass. The carrier medium with the input coupling region and the output coupling region is embodied overall as a planar capturing element for the design screen, the capturing element being adapted to a surface shape of the design screen. The capturing element can be adhesively bonded for example on a surface of the design screen. For this purpose, an adhesive can be arranged for example as a securing element on one side of the capturing element, that is to say of the carrier medium, the capturing element being adhesively bonded on the design screen. In this case, the capturing element itself is not embodied as a rigid plate, but rather is bendable nondestructively at least by a radius of typically 2 cm, such that it can be arranged for example on a curved design screen configured for example to constitute a screen of a front headlight of the motor vehicle.

The input coupling region itself is embodied as a holographic element with a first deflection structure. A description of the functioning of such a holographic element, which is often referred to as an optical grating and can be produced by holographic methods, may be found for example in the scientific publication cited above. The input coupling region can accordingly be realized for example as a diffraction grating. The first deflection structure is designed to couple light that is incident on the first deflection structure from the surroundings into the carrier medium and in the process to deflect it so far or to such a great extent that the coupled-in light satisfies the critical angle condition. The carrier medium is accordingly configured to transmit the coupled-in light from the input coupling region to the output coupling region by internal reflection, such as total internal reflection. The light that is incident on the first deflection structure from the surroundings and is coupled into the carrier medium can thus be guided for example within the carrier medium in zigzag-like movements along a direction parallel to a plane of the surface of the capturing element.

The output coupling region is embodied as a holographic element with a second deflection structure. Both the first deflection structure of the input coupling region and the second deflection structure of the output coupling region can be realized in each case as a diffraction grating, for example. The second deflection structure is designed to couple the coupled-in light that is incident on the second deflection structure out of the carrier medium. In this case, the input coupling region and the output coupling region can be situated for example on different sides of the capturing element. For example, the input coupling region can include the entire surface of the capturing element which is directed from the design screen in the direction of the surroundings and is thus oriented toward the surroundings of the motor vehicle. The output coupling region can lie on the opposite side and thus be oriented in the direction of the surface of the design screen. As an alternative or in addition thereto, the output coupling region can be arranged on a side of the carrier medium, such that the output coupling region is oriented perpendicular to the input coupling region described.

The image capturing device of the capturing device is configured to capture the light coupled out from the capturing element, that is to say the carrier medium with the input coupling region and the output coupling region, at the output coupling region and to provide image data that correlate with the captured light. The image capturing device is thus geared toward producing or generating image data from the light coupled into the image capturing device. In order to capture the light coupled out from the carrier medium, the image capturing device bears against the output coupling region. In order to secure the image capturing device to the carrier medium, the image capturing device can be adhesively bonded to the carrier medium for example. Alternatively, the carrier medium can be clamped in a holding device of the image capturing device. The image capturing device can be realized as an image sensor or a camera in each case with or without an imaging optical unit, such as, for example, a lens element or a system of lens elements. The image capturing device can be embodied for example as a CCD sensor (Charged Coupled Device) or as a CMOS sensor (Complementary Metal Oxide Semiconductor). In the case of this configuration of the image capturing device as an image sensor, the carrier medium on which the input coupling region and the output coupling region are arranged can perform the task of a lens, that is to say of an imaging optical unit. Alternatively, the image capturing device can also be realized as a camera or a photographic apparatus, in particular as a microcamera, such as is embodied for example in a modern terminal, such as a smartphone, with a dedicated imaging optical reader. The image capturing device is thus configured for generating an image of the surroundings of the external lighting device photographically and/or in a video-based manner. In general an external lighting device of a motor vehicle is positioned so high relative to the surface being driven over that it will become contaminated less quickly than for example a camera sensor arranged at a lower level, for example in a fender. The capturing element is thus arranged on the motor vehicle in a relatively exposed manner, such that an advantageous overview of the surroundings of the motor vehicle is attained. On account of its positioning relative to the surface being driven over, moreover, the capturing element in general rarely becomes contaminated and is readily visible.

The integration of the capturing device into the external lighting device for a motor vehicle enables an inconspicuous realization of an image capturing device, such as, for example, a camera system fora motor vehicle. Given suitable positioning of the image capturing device, for example below the design screen or in an edge region of the external lighting device, such as, for example, a frame thereof adjoining the design screen, the image capturing device can be integrated into the motor vehicle in a manner not visible to an observer of the vehicle and hence in an inconspicuous manner. As a result of the exposed position of the external lighting device on the motor vehicle, given corresponding positioning of individual capturing devices in all respective external lighting devices of the motor vehicle, this affords the possibility, moreover, of capturing the surroundings of the motor vehicle as a complete all-round view. In this case, it is possible to provide an angular range of 360 degrees around the motor vehicle completely in the form of image data.

One embodiment provides for the input coupling region and the output coupling region to have at least one optical grating, in particular a volume holographic grating or a surface holographic grating, as deflection structure. In this context, the capturing element can also be referred to as holocam, short for holographic camera.

An optical grating, also called diffraction grating, and its mode of operation and production method are generally known, as already mentioned, as evident for example from the scientific publication cited above. In principle, an optical grating can be based on structures which are periodic at least in sections, a so-called grating structure, in a substrate. Using such a grating structure, an optical grating can employ the physical effect of diffraction to bring about light guiding, that is known for example from mirrors, lens elements or prisms. If light is incident on the optical grating, i.e. if light rays are incident thereon, the incident light rays satisfying the Bragg equation in particular, the light rays are diffracted or deflected by the optical grating. The light guiding can thus be effected in particular by interference phenomena of the light rays diffracted by the optical grating. The deflection structure of the input coupling region or output coupling region can accordingly also be referred to as a diffraction structure.

An optical grating can be embodied in a directionally selective manner or in an angularly selective manner vis à vis the incident light. Thus, only light, in particular a portion of the light, which is incident on an optical grating from a predetermined direction of incidence, for example at a predetermined angle, can be deflected. Light, in particular a portion of the light, which is incident on the optical grating from a different direction may not be deflected, or to a lesser extent the greater the difference relative to the predetermined direction of incidence. That portion of light which deviates from the predetermined direction of incidence or optimum direction of incidence can thus propagate through the substrate with the optical grating in an unimpeded manner.

Additionally or alternatively, an optical grating can also be embodied in a wavelength-selective manner or in a frequency-selective manner. Thus, only light, in particular a first portion of the light, having a predetermined wavelength can be deflected or diffracted at a specific diffraction angle by the optical grating. Light, in particular a second portion of the light, having a different wavelength than the predetermined wavelength may not be deflected, or to a lesser extent the greater the difference relative to the predetermined wavelength. The second portion of light, deviating from the predetermined wavelength or optimum wavelength, can thus propagate through the substrate with the optical grating in an unimpeded manner. As a result, for example, at least one monochromatic light portion can be split off from polychromatic light that impinges on the optical grating. Advantageously, the deflection effect is maximal for the optimum wavelength and decreases or becomes weaker toward longer and shorter wavelengths, for example in accordance with a Gaussian bell. In particular, the deflection effect acts only on a fraction of the visible light spectrum and/or in an angular range of less than 90 degrees.

An optical grating can be produced in particular by the exposure of a substrate, that is to say for example photolithographically or holographically. In this context, the optical grating can then also be referred to as a holographic grating or a holographic optical grating. Two types of holographic optical gratings are known: surface holographic gratings (for short: SHG) and volume holographic gratings (for short: VHG). In the case of a surface holographic grating, the grating structure can be produced by optical deformation of a surface structure of the substrate. Impinging light can be deflected, for example reflected, by the altered surface structure. Examples of surface holographic gratings are so-called sawtooth or blazed gratings. In contrast thereto, the grating structure in the case of volume holographic gratings can be incorporated into the entire volume or a partial region of the volume of the substrate. Surface holographic gratings and volume holographic gratings are generally frequency-selective. However, optical gratings that can diffract polychromatic light are also known. These optical gratings are referred to as multiplexed volume holographic gratings (for short: MVHG) and can be produced for example by altering the periodicity of the grating structure of an optical grating or by arranging a plurality of volume holographic gratings one behind another.

Suitable material for the substrate for incorporating an optical grating is particularly a polymer, in particular a photopolymer, or a film, in particular a photosensitive film, for example composed of plastic or organic substances. Substrates having a deflection structure for diffracting light, for example in the form of an optical grating, can also be referred to as holographic optical elements (HOE).

The described embodiment of the input coupling region and of the output coupling region therefore enables the light that is incident on the input coupling region to be diffracted to the image capturing device arranged laterally on the cover plate, for example, as a result of which the capturing element can be designed in such a way that the image capturing device does not cover the lighting unit in the installation position of the capturing device on or in the design screen.

In a further advantageous embodiment, it is provided that the capturing element is integrated into the design screen or secured on the design screen by a securing unit. The securing unit can be embodied as an adhesive or an adhesion film, for example. What is made possible as a result is that, if the securing unit is embodied as an adhesion film, the capturing element adheres to a surface of the design screen directly, that is to say without an adhesive, by way of molecular forces. The capturing element can thus be produced in various ways and particularly cost-effectively since it can be embodied for example just as a thin holographic film that is adhesively bonded onto the design screen.

As an alternative thereto, the capturing element can be incorporated into the design screen itself. For example, for this purpose, a predefined partial region of the design screen, which is produced from plastic, for example, can be provided, a holographic plate being arranged in the partial region, such that the capturing element is fixedly integrated into the design screen. This has the advantage that such an arrangement of the capturing element is particularly robust for example with regard to forces acting on the design screen from outside, since for example even in the context of everyday use during driving and external force effects associated therewith, for example as a result of frequent and intensive changes in the weather, the capturing element is always fixedly integrated into the design screen and thus cannot become detached from the design screen without an appropriate level of external action. In the case of securing by an adhesive, for example, it would be conceivable for the capturing element to be detached from the design screen under appropriate weather conditions.

A further particularly advantageous embodiment provides for the capturing element to be embodied as a transparent plate, film or coating. The carrier medium of the capturing element may be planar. The planar carrier medium can have a thickness of between half a millimeter and five millimeters, for example. If the planar carrier medium is embodied as a transparent film, it is moreover embodied in bendable fashion, that is to say that it can be deformed nondestructively, wherein nondestructive deformation is understood to mean nondestructive bending of the film by a bending radius of less than two centimeters. If the planar carrier medium is embodied as a transparent coating, it can have a thickness in the micrometers range and thus of less than one millimeter. What is achieved as a result is that the planar carrier medium with the input coupling region and the output coupling region, that is to say the capturing element, can be arranged arbitrarily on the design screen, without for example the design screen itself or the lighting unit being masked. As a result, the capturing element becomes able to be integrated arbitrarily into or onto the design screen.

In accordance with a further embodiment, it is provided that the external lighting device has two capturing devices arranged in a manner spatially separated from one another on two mutually opposite edge regions of the design screen. For example, in the case of an external lighting device as a front headlight of the motor vehicle, the design screen can be curved, such that a front part of the design screen is directed in the longitudinal direction of the vehicle, whereas a rear opposite lateral part of the design screen points in the transverse direction of the vehicle. If respective capturing devices are positioned, i.e. respective capturing elements with an associated image capturing device are arranged, then both in the front region and in the rear region, both a front region of the motor vehicle and the lateral region of the motor vehicle can be monitored by the two capturing devices. This contributes to the fact that ultimately for example given respective external lighting devices in both front headlights and in both rear lights of the motor vehicle, this enables the all-round capture of the surroundings of the motor vehicle by the capturing device. As an alternative to the described arrangement in or on the design screen, respective planar capturing elements can be arranged for example in an upper and lower region in the vehicle vertical direction of the design screen. Ultimately, therefore, this enables the all-round capture of the surroundings of the motor vehicle by suitably positioned capturing devices.

A further advantageous embodiment provides for the external lighting device to include an evaluation device configured, by evaluating the image data, to capture at least one object in the surroundings of the motor vehicle, to recognize the captured object by applying an object recognition criterion and to provide object data describing the recognized object. The evaluation device can thus carry out object recognition for example on the basis of a machine learning method, for example by an artificial neural network. With the aid of the evaluation device, it is thus possible to recognize whether, in the image data correlated with the captured light, a continuous object should be recognized, such as, for example, a person, an article or a symbol, such as a traffic sign, for example, which is arranged in the surroundings of the motor vehicle.

Furthermore, the evaluation device is configured to recognize the captured object by taking account of the object recognition criterion, that is to say that the object recognition criterion includes characteristics of different objects stored in a database, for example. For example, a typical size, coloration and/or shapes, a typical reflection behavior of light at the object and/or a typical location-dependent and/or time-dependent arrangement of the object are/is stored in this case. By way of example, another vehicle approaching the motor vehicle in the oncoming traffic lane can then be captured and recognized as the object. Object data describing the recognized object are provided by the evaluation device, such that they can be communicated for example to a control device of the motor vehicle or of the external lighting device itself. In this example, the object data include the information that a vehicle that is moving toward the motor vehicle has been recognized.

For this purpose, the evaluation device has for example a processor device configured to carry out the object recognition described. To that end, the processor device can have at least one microprocessor or at least one microcontroller. Furthermore, the processor device can have a program configured to carry out the object recognition described upon execution by the processor device. The program can be stored in a data memory of the processor device.

The capturing device can thus not only record and thus provide an image representation of the surroundings of the motor vehicle, but also—with the aid of suitable evaluation methods—actually examine the surroundings of the motor vehicle and provide the object data describing the recognized objects. Such an evaluation of the data captured by the capturing device is expedient for example for supporting a parking assistant of the motor vehicle during a parking process, since, for example, by the capturing device positioned in and/or on the design screen of the respective external lighting device of the motor vehicle, corresponding surroundings data are acquired which provide information about the object or a plurality of objects in the surroundings and thus enable same to be respectively identified.

In a further particularly advantageous embodiment, it is provided that the external lighting device includes a control device for controlling a lighting unit of the external lighting device. For example, a luminous intensity of the respective lighting unit, that is to say for example of the front headlight or of the rear light of the motor vehicle, can be set by the control device. The evaluation device is configured, by applying the object recognition criterion, to recognize a vehicle that is moving toward the capturing element and emitting light. On the basis of the object recognition described above, it is thus possible to recognize whether an object in the surroundings of the motor vehicle is another vehicle. Moreover, it is possible in this case to recognize whether the other vehicle is emitting light, that is to say has at least one activated exterior luminaire. The emission of light, that is to say an activated exterior luminaire of the approaching moving vehicle, can be recognized for example on the basis of corresponding light intensity signals which are emitted by the approaching moving vehicle and are captured by the external lighting device.

If the vehicle that is moving toward the capturing element and emitting light has been recognized, the evaluation device is designed to provide a low-beam signal for the lighting unit by applying a driving situation criterion. The driving situation criterion includes information such as, for example, the information of whether or not the motor vehicle and the captured motor vehicle are moving toward one another frontally. A direction of movement of the capturing device and of the recognized vehicle relative to one another is thus considered. This is because it is only when the vehicles are moving toward one another that for example currently activated high-beam lights of front luminaires of the motor vehicle should be reduced in their intensity and thus be switched to low beam. The fact that the vehicle is moving toward the motor vehicle can be recognized for example from the color of the respective light emitted by the vehicle, since a vehicle travelling ahead of the motor vehicle and moving in the same direction of travel emits red luminous light from the rear luminaires in the direction of the motor vehicle, whereas a vehicle that is moving toward the motor vehicle from the rear or front in the longitudinal direction of the vehicle emits white light from its front luminaires. As an alternative or in addition thereto, for determining the direction of movement of the motor vehicle, data from corresponding sensors of the motor vehicle can be provided for the evaluation device and can be communicated to the latter, such that on the basis of these sensor data, by applying the driving situation criterion, the direction of movement of the motor vehicle and of the vehicle with respect to one another can be determined particularly reliably and accurately. With the aid of the driving situation criterion, moreover, it is possible to take account of whether the motor vehicle and the vehicle are travelling in daylight or in darkness, since, particularly in the case of travel in darkness, timely switching of a high beam to low beam is expedient in order that the driver of the approaching moving vehicle that is emitting light is not dazzled and possibly irritated.

The control device of the external lighting device is configured to set a light intensity of the lighting unit in a manner corresponding to the low-beam signal provided by the evaluation device. Thus, if it is detected that a vehicle that is travelling with activated front light and is moving toward the motor vehicle is travelling in the oncoming traffic lane, for example, the control device is informed of this vehicle by the low-beam signal and, in the event of high-beam luminaires currently being activated, will thereupon reduce their intensity, that is to say switch them to low beam.

What can thus be achieved with the external lighting device is that possible dazzling of oncoming vehicles is registered at an early stage and corresponding information for setting the luminous intensity of the exterior luminaires of the motor vehicle, such as the front luminaires, for example, is provided for the control device by the evaluation device. Reliable and rapid automatic switching of high-beam light to low beam can thus be realized by the external lighting device.

In accordance with one particularly advantageous embodiment, it is provided that the external lighting device has a light source, a sensor device and an evaluation device and a sensor output coupling region is provided on the carrier medium. The light source is a laser, for example, which emits light in the wavelength range of infrared light, for example. The light source is moreover configured to emit pulsed light. In this case, the light emitted by the light source is emitted for example directly into the surroundings of the motor vehicle, an object being situated in the surroundings, for example. The evaluation device mentioned here can be an additional evaluation device of the external lighting device. As an alternative thereto, however, the evaluation device can correspond to the evaluation device already mentioned above for determining the low-beam signal, that is to say that the external lighting device can have only one evaluation device, which can carry out various evaluation processes.

The first deflection structure of the input coupling region is designed to couple light that was emitted by the light source and was reflected at the object in the surroundings into the carrier medium. The light source is thus positioned in such a way that it emits the pulsed light for example in the direction of a wall in the surroundings of the motor vehicle, which light is thereupon reflected at the wall and is coupled into the carrier medium via the input coupling region. The carrier medium is configured to transmit the coupled-in reflected light from the input coupling region to the sensor output coupling region by internal reflection. In this case, the sensor output coupling region is embodied as a holographic element on a third deflection structure. The third deflection structure can be embodied as a diffraction grating, for example, just like the corresponding deflection structure at the output coupling region and at the input coupling region. The third deflection structure is designed to couple the reflected light that was coupled into the carrier medium out of the carrier medium. The sensor device is then oriented relative to the capturing element and ultimately relative to the sensor output coupling region in such a way that the sensor device is configured to capture the light coupled out at the sensor output coupling region and to provide it in the form of sensor data. The sensor data describe a time of flight of the light that was emitted by the light source and reflected at the object and captured by the sensor device. The evaluation device is then configured by evaluating the sensor data, to provide distance data describing a distance between the object and the capturing device.

Given a suitable choice of the light source and the sensor device, a laser distance measurement can thus be carried out, for example, which determines for example a distance between the motor vehicle and the object, that is to say strictly speaking between the external lighting device of the motor vehicle and the object, wherein the object in this example is the wall in the surroundings of the motor vehicle. Corresponding distance data can be made available to a driver assistance system or to some other control device of the motor vehicle, for example, such that on the basis of these data, for example, a parking assistant can plan and carry out an automatic or at least partly automatic parking process for parking the motor vehicle in a parking gap next to the wall. As an alternative or in addition thereto, on the basis of the distance data, emergence from an entry can be monitored and optimized, an object that is approaching and/or is already in a blind spot with respect to the motor vehicle can be recognized, an object that is apparent only when the driver looks behind over his/her shoulder can be detected and/or an emergency stop can be carried out in the case where an object is moving toward the vehicle frontally or laterally. The advantage of the external lighting device over known surroundings capturing devices here is that the external lighting device captures respective partial regions of the surroundings of the motor vehicle over a large area at an optimum height in the vertical direction of the motor vehicle. This is because the individual capture regions of the external lighting devices are not embodied in punctiform fashion, as is the case with known camera sensors, but rather are embodied in a manner extended over a large area, over the entire surface of the capturing element covering for example the design screen completely or at least regionally. In this case, even upon for example regional soiling of the motor vehicle that extends at least regionally over the design screen of the external lighting device, it still becomes possible for the surroundings of the motor vehicle to be captured since it is unlikely that the large-area capturing element will be completely affected by the soiling.

An additional embodiment provides for a light input coupling region and a light output coupling region to be provided on the carrier medium in addition to the sensor output coupling region. The light input coupling region is embodied as a holographic element with a fourth deflection structure, which is embodied as a diffraction grating, for example. The fourth deflection structure is designed to couple light that is incident on the fourth deflection structure from the light source into the carrier medium. the light input coupling region is be positioned for example next to the light source that emits pulsed light, such that the pulsed light emitted by it is coupled into the carrier medium via the light input coupling region. The carrier medium is configured to transmit the coupled-in light from the light input coupling region to the light output coupling region by internal reflection. The light output coupling region is embodied as a holographic element with a fifth deflection structure, which is embodied as a diffraction grating, for example. The fifth deflection structure is designed to couple the transmitted light that is incident on the fifth deflection structure out of the carrier medium and to emit it into the surroundings. In addition to pure input coupling, transport and output coupling of the light respectively sent from the surroundings in the direction of the capturing element, the light from the light source can already be transported by the carrier medium and thus by the capturing element to a desired output coupling region, the so-called light output coupling region, and from there can be emitted into the surroundings. In this case, the carrier medium with the light input coupling region and the light output coupling region can be spatially separated from the carrier medium with the input coupling region in the output region. However, the four coupling regions mentioned can also be provided on one and the same carrier medium, such that the capturing device of the external lighting device has only one planar carrier medium, into which light is emitted from different directions and with different output coupling regions as target positions. This makes it possible, for example, for both the light source and for example the image capturing device and the sensor device to be arranged at respective edge regions of the external lighting device, for example at the edge of the design screen or behind the design screen, and nevertheless, from a predefined region on the design screen, for light from the light source to be emitted or ambient light to be coupled in and communicated to the corresponding sensor device or image capturing device. As a result, the capturing element of the external lighting device becomes optically inconspicuous and can be installed for example in a front headlight or a rear light of the motor vehicle in a manner invisible to an observer.

The light input coupling region can correspond to the output coupling region at least regionally, for example, wherein the light output coupling region can correspond to the input coupling region at least regionally.

The motor vehicle has an external lighting device such as has been described above. The embodiments presented in association with the external lighting device and their advantages correspondingly hold true, insofar as applicable, for the motor vehicle. For this reason, the corresponding developments of the motor vehicle will not be described again here.

The motor vehicle may be an automobile, in particular as a car or truck, or a passenger bus or motorcycle.

BRIEF DESCRIPTION OF THE DRAWINGS

Exemplary embodiments are described below in conjunction with the accompanying drawings of which.

DETAILED DESCRIPTION

Figure 1:
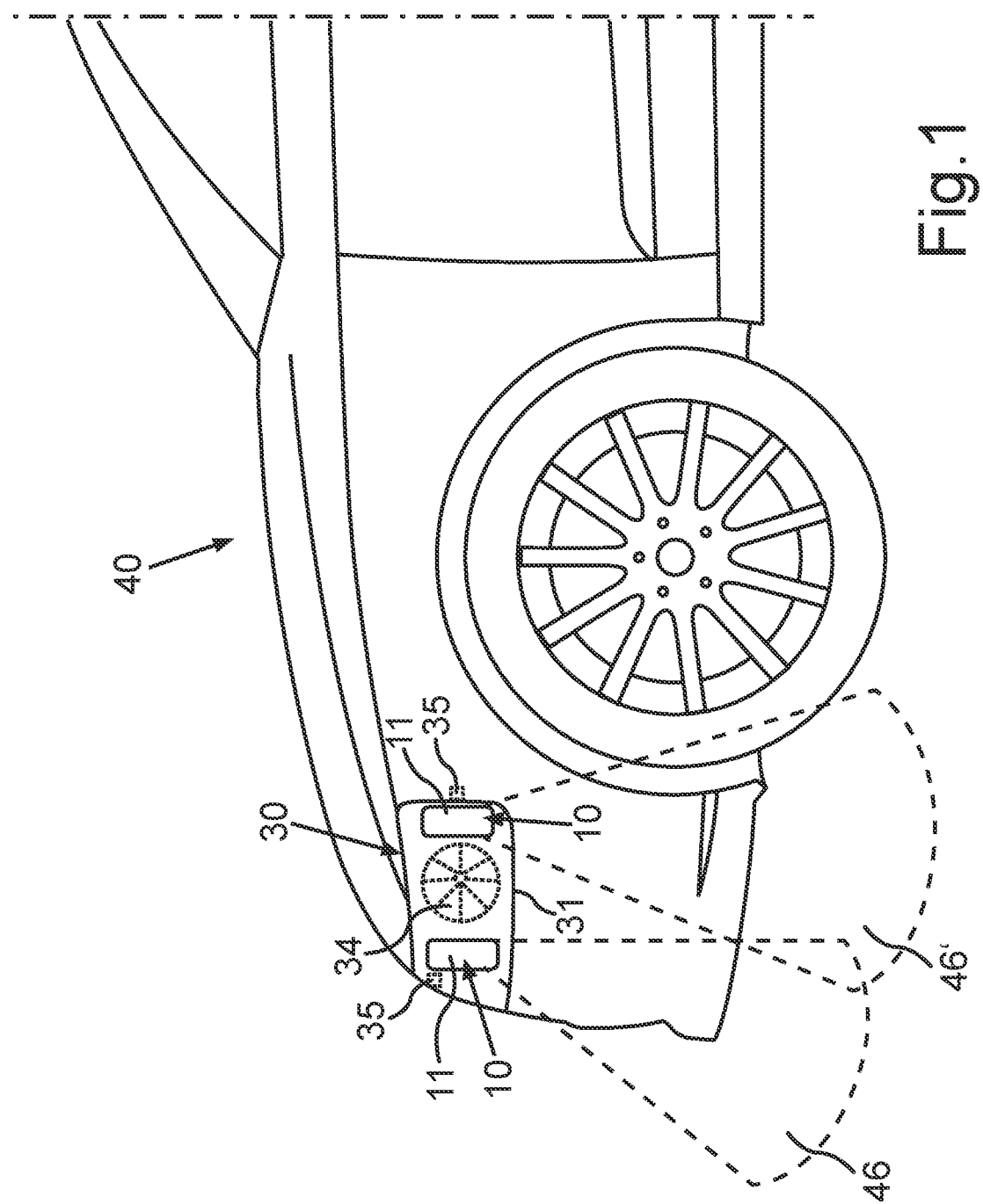
FIG. 1 is a schematic front left side view of a motor vehicle with an external lighting device.

The exemplary embodiments explained below concern embodiments of the external lighting device and motor vehicle. In the exemplary embodiments, the described components of the embodiments each constitute individual features which should be considered independently of one another and which each also develop the invention independently of one another. Therefore, the disclosure is also intended to encompass combinations of the features of the embodiments other than the combinations presented. Furthermore, the embodiments described can also be supplemented by further features from among those already described.

In the figures, identical reference characters in each case designate functionally identical elements.

FIG. 1 schematically depicts a motor vehicle 40 with an external lighting device 30 as a left front headlight at the front in the longitudinal direction of the vehicle. The external lighting device 30 has a design screen 31, a lighting unit 34 arranged behind the latter, the lighting unit being configured to emit white lighting unit light through the design screen 31, and a capturing device 10. The capturing device 10 has a capturing element 11 and an image capturing device 35, which here is arranged behind the design screen 31. The external lighting device 30 includes two capturing elements 11, specifically one in a region of the design screen 31 that is at the front in the longitudinal direction of the vehicle and one in a region of the design screen 31 that is at the rear in the longitudinal direction of the vehicle. As an alternative thereto, the external lighting device 30 can have only one capturing element 11 or more than two capturing elements 11. The external lighting device 30 is configured to provide image data that are correlated with light 100 (represented by the reference sign 100 in FIG. 4) that impinges on the two capturing elements 11 from the surroundings. The external lighting device 30 thus makes it possible to capture the surroundings of the motor vehicle 40. A respective capture region 46, 46' of the two capturing elements 11 is depicted schematically as capturing region 46 at the front in the longitudinal direction of the vehicle and as capturing region 46' at the rear in the longitudinal direction of the vehicle, in each case in the form of regions schematically depicted in conical fashion in FIG. 1. The front capturing element 11 is designed "to look" at least partly in front of the motor vehicle 40 in the longitudinal direction of the vehicle and next to the motor vehicle in the transverse direction of the vehicle, that is to say to capture the surroundings there. By contrast, the rear capturing element 11 with the capture region 46' is configured to capture only a lateral region of the surroundings of the motor vehicle 40, that is to say the region to the left of the motor vehicle 40 in the longitudinal direction of the vehicle.

A further external lighting devices 30 as right front headlight (not depicted schematically here) at the front and also two further external lighting devices 30 as respective rear lights (not depicted schematically) may be integrated into the motor vehicle 40. If the motor vehicle 40 includes at least these four external lighting devices 30, complete all-round capturing of the surroundings of the motor vehicle 40 is possible.

Figure 2:
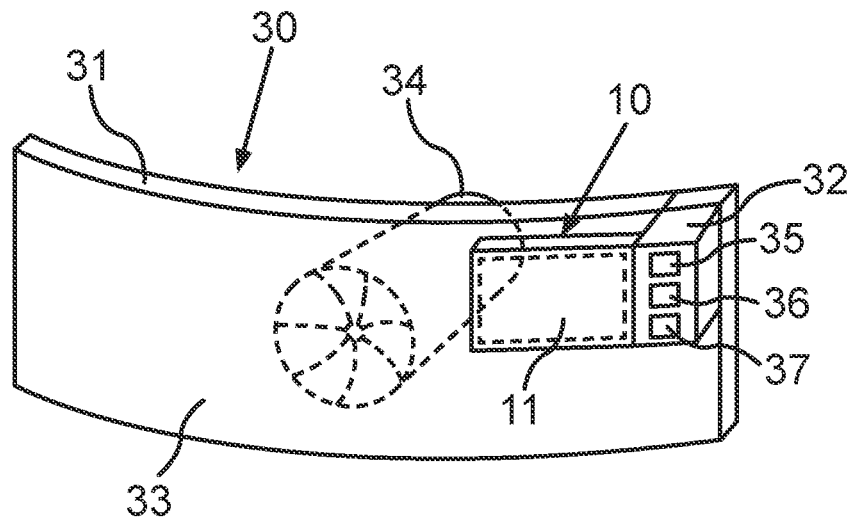
FIG. 2 is a schematic perspective view of an external lighting device for a motor vehicle with a capturing element secured on a design screen.

FIG. 2 schematically depicts the external lighting device 30, wherein the capturing element 11 is positioned on the design screen 31 by a securing unit 32. In this case, the capturing element 11 can have a slight curvature and can thus be positioned parallel to a surface shape 33 of the design screen 31 but at a predefined distance from the surface of the design screen 31. Moreover, FIG. 2 schematically depicts the fact that the capturing device 10 can have as components of the external lighting device 30, in addition to the image capturing device 35, an evaluation device 36 and a control device 37 for controlling the lighting unit 34.

Figure 3:
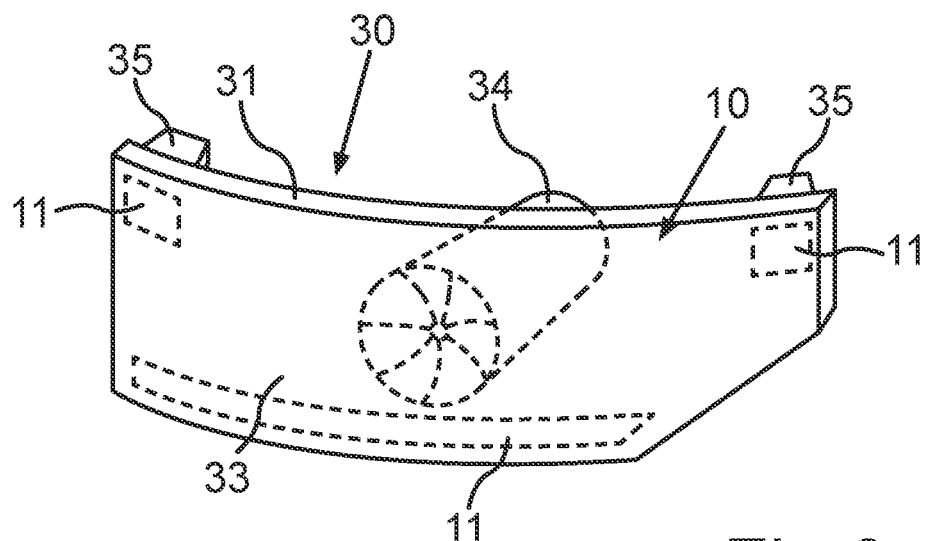
FIG. 3 is a perspective view of an external lighting device for a motor vehicle with a capturing element integrated into a design screen.

FIG. 3 schematically depicts the external lighting device 30, wherein three capturing elements 11 are integrated directly into the design screen 31. For this purpose, for example, transparent plates shaped in the manner adapted to the local surface course of the design screen 31 are integrated into the design screen 31. Moreover, FIG. 3 schematically depicts the respective image capturing devices 35 for the two upper capturing elements 11, which image capturing devices here are positioned behind the design screen 31 and thus in a manner not directly visible to an observer. Moreover, it becomes clear here that the respective capturing elements 11 can be arranged in a manner spatially separated from one another, for example on mutually opposite edge regions of the design screen 31, or can extend for example over an entire longitudinal side of the design screen 31 running in the longitudinal direction of travel.

Figure 4:
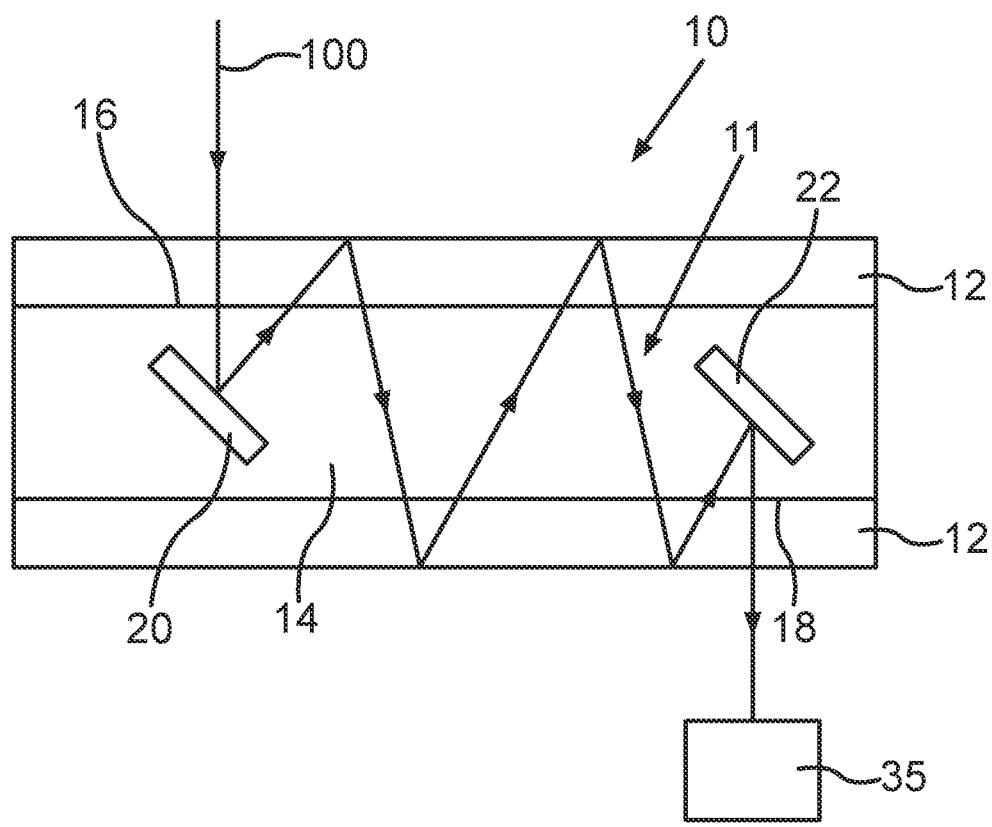
FIG. 4 is a schematic illustration of a capturing element for a design screen of a motor vehicle.

FIG. 4 schematically depicts the functioning of the external lighting device 30. It becomes clear here that the capturing device 10 includes a carrier medium 12, which is embodied as a light guide and on which an input coupling region 16 and an output coupling region 18 are provided. The carrier medium 12 with the input coupling region 16 and the output coupling region 18 is the planar capturing element 11 for the design screen 31, the capturing element being adapted to the surface shape 33 of the design screen 31.

The input coupling region 16 is embodied as a holographic element 14 with a first deflection structure 20. The first deflection structure 20 is designed to couple light 100 that is incident on the first deflection structure 20 from the surroundings of the motor vehicle 40 into the carrier medium 12. The carrier medium 12 is configured to transmit the coupled-in light 100 from the input coupling region 16 to the output coupling region 18 by internal reflections. The output coupling region 18 is embodied as a holographic element 14 with a second deflection structure 22. The second deflection structure 22 is designed to couple the transmitted light 100 that is incident on the second deflection structure 22 out of the carrier medium 12. Arranged directly behind that is the image capturing device 35, for example. The image capturing device 35 is configured to capture the light 100 that is coupled out of the capturing element 11 at the output coupling region 18 and to provide it as image data that correlate with the captured light 100. The image capturing device 35 can thus be embodied as a camera sensor, for example. The input coupling region 16 and the output coupling region 18 have at least one optical grating, in particular a volume holographic grating or a surface holographic grating, as deflection structure 20, 22. In this case, the capturing element 11 itself can be embodied as a transparent plate, film or coating.

The evaluation device 36 can be configured, by evaluating the image data provided by the image capturing device 35, to capture at least one object 42 in the surroundings, to recognize the captured object 42 by applying an object recognition criterion and to provide object data describing the recognized object 42.

Figure 5:
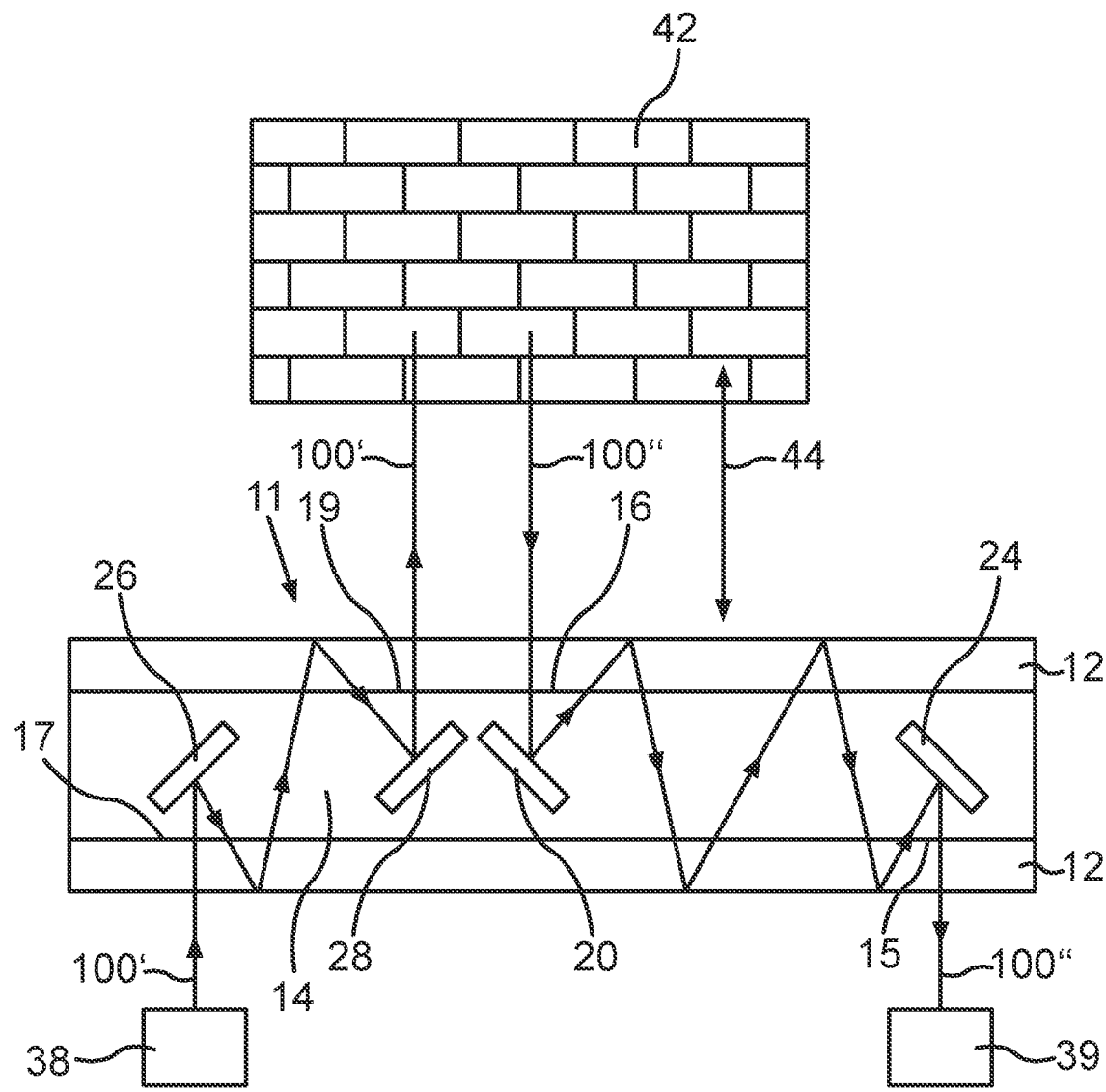
FIG. 5 is a schematic illustration of a distance determination using an external lighting device of a motor vehicle.

FIG. 5 schematically depicts a wall in the surroundings of the motor vehicle 40 as such an object 42. The object 42, that is to say the wall, is situated at a distance 44 from the motor vehicle 40. The external lighting device 30 additionally includes a light source 38 and a sensor device 39. Moreover, a sensor output coupling region 15 is provided on the carrier medium 12, the sensor output coupling region being embodied as a holographic element 14 with a third deflection structure 24. The light source 38 is configured to emit pulsed light 100' directly into the surroundings of the motor vehicle 40. The pulsed light 100' can be infrared laser light, for example. As is depicted schematically in FIG. 5, the pulsed light 100' emitted by the light source 38 can also be emitted to the object 42 indirectly, specifically through the planar carrier medium 12, that is to say through the capturing element 11. For this purpose, a light input coupling region 17 and a light output coupling region 19 are provided on the planar carrier medium 12. In this case, the light input coupling region 17 is embodied as a holographic element 14 with a fourth deflection structure 26, which is designed to couple the pulsed light 100' that was emitted by the light source 38 and is incident on the fourth deflection structure 26 into the carrier medium 12. The carrier medium 12 is configured to transmit the coupled-in pulsed light 100' from the light input coupling region 17 to the light output coupling region 19 by internal reflection. The light output coupling region 19 is embodied as a holographic element 14 with a fifth deflection structure 28, which is designed to couple the transmitted light 100' that was emitted by the light source 38 and is incident on the fifth deflection structure 28 out of the carrier medium 12 and to emit the light into the surroundings, that is to say in the direction of the object 42. The light 100" reflected at the wall, which light was first emitted by the light source 38 and then reflected at the object 42 in the surroundings, can be coupled into the carrier medium 12 again by the input coupling region 16 if this reflected light 100" is incident on the first deflection structure 20.

The carrier medium 12 is configured to transmit this coupled-in reflected light 100" from the input coupling region 16 to the sensor output coupling region 15 by internal reflection. The sensor output coupling region 15 with the third deflection structure 24 serves the purpose that the reflected light 100" impinging on the third deflection structure 24 is coupled out of the carrier medium 12. The sensor device 39 is configured to capture the light 100" that is coupled out at the sensor output coupling region 15 and to provide it in the form of sensor data. The sensor data describe a time of flight of the light 100" that was emitted by the light source 38 and was reflected at the object 42 and was captured by the sensor device 39. The evaluation device 36 is then configured to provide distance data by evaluating the sensor data. The distance data describe the distance 44 between the object 42 and the capturing device 10, that is to say ultimately the motor vehicle 40.

The evaluation device 36 is configured, moreover, by applying the object recognition criterion, to recognize a vehicle that is moving toward the capturing element 11 and is emitting light. If the vehicle that is moving toward the capturing element 11 and emitting light has been recognized, a low-beam signal for the lighting unit 34 is provided by applying a driving situation criterion. The control device 37 of the external lighting device 30, which is schematically depicted in FIG. 2, is designed to set a light intensity of the lighting unit 34 in a manner corresponding to the low-beam signal provided by the evaluation device 36. If it is thus recognized for example that a vehicle is moving toward the motor vehicle 40, it may be recognized that the motor vehicle 40 is currently travelling with high beam activated, for example, but the high beam should be switched to low beam on account of the other vehicle approaching from the front. In this case, the control device 37 can reduce the light intensity of the lighting unit 34 after receiving the low-beam signal. The oncoming vehicle can be recognized for example on the basis of a color of the headlight light emitted by the vehicle, where the headlight light was captured as light 100 by one of the image capturing devices 35 of the motor vehicle 40. On the basis of movement data of the motor vehicle 40 itself, the data being provided by the evaluation device 36, and also the information stored in the object recognition criterion, for example concerning the object recognition of vehicles, it is possible moreover unambiguously to recognize that an object 42 is situated in the surroundings of the motor vehicle 40, which object is recognized as an illuminated vehicle, and the recognized vehicle is travelling toward the motor vehicle 40 from the front, and so the high beam of the motor vehicle 40 should thus be deactivated. Such evaluation and control commands for the luminous intensity of the lighting unit 34 can thus be determined and carried out by the external lighting device 30.

Described herein is the integration of a holographic element (HOE) into a vehicle lighting system, that is to say the external lighting device 30 for the motor vehicle 40. Using the external lighting device 30, image contents containing the surroundings of the motor vehicle 40 can be recorded by capturing elements 11 arranged in the design screen 31 or on the design screen 31 of the motor vehicle 40. This affords the following advantages: by virtue of the planar embodiment of the capturing element 11, the latter can become soiled less rapidly, can be kept transparent and can thus not be directly visible and can be equipped with various optical functions such as, for example, the provision of image data and/or the emission of pulsed light 100' by the light source 38. By virtue of the position of the design screen 31, moreover, an exposed location on the motor vehicle 40 is chosen which enables an optimum overview of the surroundings, such that particularly reliable surroundings data can ultimately be provided. The information provided by the external lighting device 30 can contribute for example to at least partly autonomous parking, to recognition of objects 42 that are approaching or are already in the blind spot, to emergence from entries obstructing the view toward the left and right, or to fully automated parking and the associated recognition of free spaces. Moreover, the external lighting device 30 can register possible dazzling of oncoming vehicles and make the associated information available for setting the lighting unit 34, that is to say determine the corresponding low-beam signal and provide it for the control device 37 of the lighting unit 34.

Moreover, by laser distance measurement, the respective capturing elements 11 can determine the distance 44 between the motor vehicle 40 and the object 42 in the surroundings of the motor vehicle 40 and thus increase a measurement accuracy of sensors of the motor vehicle 40 during parking, for example. The laser distance measurement is effected by capturing and evaluating the light 100" that was emitted by the light source 38 and reflected at the object 42.

For this purpose, the external lighting device 30 can either be equipped with a separate securing unit 32, to which the capturing element 11 is secured. As an alternative thereto, the design screen 31 itself can the capturing element 11. In this case, the capturing element 11, that is to say the planar carrier medium 12, can be relatively small and thus implement approximately punctiform measurement, but can also be embodied in planar fashion in order for example to enable large-angle recordings of the surroundings.

It is possible moreover to use a plurality of capturing elements 11 with a plurality of image capturing devices 35 in order to counteract possible loss of light or loss of recording quality. The image capturing devices 35 can each be installed behind the design screen 31, either behind the bodywork itself or in a concealed position within the external lighting device 30, and thus be concealed. It is possible moreover to emit light 100' from the light source 38 into the surroundings directly or through the capturing element 11 in order thus to illuminate the surroundings or just, as described above, to measure the distance to the object 42, that is to say to determine the distance 44.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. An external lighting device for lighting surroundings of a motor vehicle, comprising:
   a design screen having a surface shape; and
   at least two capturing devices with camera sensors and carrier mediums for the camera sensors, respectively,
      the at least two capturing devices arranged spatially separated at opposite edge regions of the design screen,
      a carrier medium of the carrier mediums of a capturing device of the at least two capturing devices including a light guide having an external light input region and an external light output region, so that each carrier medium corresponding to each capturing device of the at least two capturing devices is arranged on different sides at the opposite edge regions of the design screen, and each carrier medium is adapted to the surface shape of the design screen, so that each carrier medium is planar with a width and a length of each carrier medium greater than a thickness of each carrier medium,
      the external light input region including a first holographic element with a first deflection structure to couple external light to be incident on the first deflection structure from the surroundings into the carrier medium,
      the carrier medium being configured to transmit the external light from the external light input region to the external light output region by internal reflection,
      the external light output region including a second holographic element with a second deflection structure to couple the external light to be incident on the second deflection structure out of the carrier medium, and
      the camera sensors of the at least two capturing devices being configured to capture the external light coupled out of the external light output region of each carrier medium of the carrier mediums respectively corresponding to the camera sensors, so that at least two camera sensors of the camera sensors provide image data correlated with external light captured by the at least two camera sensors corresponding to capturing regions of the at least two capturing devices at the opposite edge regions of the design screen, respectively.

2. The external lighting device as claimed in claim 1, wherein the external light input region and the external light output region each have at least one grating from among a volume holographic grating and a surface holographic grating.

3. The external lighting device as claimed in claim 2, wherein the carrier medium is integrated into the design screen and/or secured on the design screen.

4. The external lighting device as claimed in claim 3, wherein the carrier medium is embodied as at least one component from among a transparent plate, a film and a coating.

5. The external lighting device as claimed in claim 1,
   wherein the external lighting device further comprises a processor configured to evaluate the image data, to
      capture at least one object in the capturing regions in the surroundings,
      recognize the at least one object by applying an object recognition criterion, and
      provide object data describing the at least one object.

6. The external lighting device as claimed in claim 5, wherein the external lighting device illuminates an other vehicle, and
   further comprises:
      a first light configured to illuminate part of the surroundings; and
      a controller to control the first light,
   wherein the processor, by applying the object recognition criterion, is configured to
      recognize the other vehicle as moving toward the carrier medium and emitting oncoming light, and
      after the other vehicle has been recognized, provide a low-beam signal for the first light by applying a driving situation criterion, and
   wherein the controller is configured to set a light intensity of the first light in response to the low-beam signal provided by the processor.

7. The external lighting device as claimed in claim 5,
   further comprising:
      a sensor, and
      a second light configured to emit pulsed light into the surroundings, wherein the first deflection structure of the external light input region is configured to couple the pulsed light to be emitted by the second light and reflected by the at least one object in the surroundings into the carrier medium, wherein the carrier medium further includes a sensor output coupling region and is configured to transmit the pulsed light to be incident on and coupled by the external light input region to the sensor output coupling region by internal reflection, the sensor output coupling region being embodied as a third holographic element with a third deflection structure to couple the pulsed light that was coupled into the carrier medium out of the carrier medium, wherein the sensor is configured to
capture the pulsed light coupled out of the sensor output coupling region, and
provide sensor data describing a time of flight of the pulsed light emitted by the second light, reflected by the at least one object, and captured by the sensor, and wherein the processor is configured, by evaluating the sensor data, to provide distance data describing a distance between an object of the at least one object and a capturing device of the at least two capturing devices.

8. The external lighting device as claimed in claim 7,
wherein a light source input region and a light source output region are provided on the carrier medium,
wherein the light source input region is embodied as a fourth holographic element with a fourth deflection structure to couple the pulsed light to be incident on the fourth deflection structure from the second light into the carrier medium,
wherein the carrier medium is configured to transmit the pulsed light from the light source input region to the light source output region by internal reflection, and
wherein the light source output region is embodied as a fifth holographic element with a fifth deflection structure to couple the pulsed light to be incident on the fifth deflection structure out of the carrier medium and emit the pulsed light into the surroundings.

9. The external lighting device as claimed in claim 1, wherein the carrier medium is integrated according to any one or combination of integrated into the design screen and secured on the design screen.

10. The external lighting device as claimed in claim 1, wherein the carrier medium is embodied as any one or combination of a transparent plate, a film and a coating.

11. The external lighting device as claimed in claim 1,
wherein the external lighting device further comprises a processor configured to evaluate the image data, to
capture at least one object in the capturing regions in the surroundings,
recognize the at least one object by applying an object recognition criterion, and
provide object data describing the at least one object.

12. The external lighting device as claimed in claim 11, wherein the external lighting device illuminates an other vehicle, and
further comprises:
a first light configured to illuminate part of the surroundings; and
a controller configured to control the first light,
wherein the processor, by applying the object recognition criterion, is configured to
recognize the other vehicle as moving toward the carrier medium and emitting oncoming light, and
after the other vehicle has been recognized, provide a low-beam signal for the first light by applying a driving situation criterion, and
wherein the controller is configured to set a light intensity of the first light in response to the low-beam signal provided by the processor.

13. The external lighting device as claimed in claim 1, wherein the external lighting device further comprises:
a sensor; and
a second light configured to emit pulsed light into the surroundings,
wherein the first deflection structure of the external light input region is configured to couple the pulsed light emitted by the second light and reflected by at least one object in the surroundings into the carrier medium,
wherein the carrier medium further includes a sensor output coupling region and is configured to transmit the pulsed light to be incident on and coupled by the external light input region to the sensor output coupling region by internal reflection, the sensor output coupling region being embodied as a third holographic element with a third deflection structure to couple the pulsed light coupled into the carrier medium out of the carrier medium,
wherein the sensor is configured to
capture the pulsed light coupled out of the sensor output coupling region, and
provide sensor data describing a time of flight of the pulsed light emitted by the second light, reflected by the at least one object, and captured by the sensor, so that a processor configured to evaluate the sensor data, is to provide distance data describing a distance between an object of the at least one object and a capturing device of the at least two capturing devices.

14. The external lighting device as claimed in claim 13,
wherein a light source input region and a light source output region are provided on the carrier medium,
wherein the light source input region is embodied as a fourth holographic element with a fourth deflection structure to couple the pulsed light to be incident on the fourth deflection structure from the second light into the carrier medium,
wherein the carrier medium is configured to transmit the pulsed light from the light source input region to the light source output region by internal reflection, and
wherein the light source output region is embodied as a fifth holographic element with a fifth deflection structure to couple the pulsed light to be incident on the fifth deflection structure out of the carrier medium and emit the pulsed light into the surroundings.

15. A motor vehicle situated in surroundings, comprising:
a chassis; and
an external lighting device including
a design screen having a surface shape, and
at least two capturing devices with camera sensors and carrier mediums, respectively,
the at least two capturing devices arranged spatially separated at opposite edge regions of the design screen, a carrier medium of the carrier mediums of a capturing device of the at least two capturing devices adapted to the surface shape of the design screen, so that each carrier medium of the carrier mediums is planar with a width and a length of each carrier medium greater than a thickness of each carrier medium, each carrier medium including a light guide having an external light input region and an external light output region to transmit external light from the external light input region to the external light output region by internal reflection, so that each carrier medium corresponding to each capturing device of the at least two capturing devices is arranged on different sides of at the opposite edge regions of the design screen, the external light input region being embodied as a first holographic element with a first deflection structure to couple the external light to be incident on the first deflection structure from the surroundings into the carrier medium and the external light output region including a second holographic element with a second deflection structure to couple the external light to be incident on the second deflection structure out of the carrier medium, and the camera sensors of the at least two capturing devices configured to capture the external light coupled out of the external light output region of each carrier medium of the carrier mediums respectively corresponding to the camera sensors, so that at least two camera sensors of the camera sensors provide image data correlated with external light captured by the at least two camera sensors corresponding to capturing regions of the at least two capturing devices at the opposite edge regions of the design screen, respectively.

16. The motor vehicle as claimed in claim 15, wherein the external lighting device illuminates an other vehicle, wherein the carrier medium is integrated according to any one or combination of integrated into the design screen and secured on the design screen, and wherein the external lighting device further comprises:
  a first light configured to illuminate part of the surroundings;
  a processor coupled to a camera sensor of the camera sensors and configured to
    recognize the other vehicle as moving toward the carrier medium and emitting oncoming light, by applying an object recognition criterion to the image data provided by the camera sensor, and
    generate a low-beam signal, after the other vehicle has been recognized, by applying a driving situation criterion to the image data, and
  a controller, coupled to the processor and the first light, configured to set a light intensity of the first light in response to the low-beam signal provided by the processor.

17. The motor vehicle as claimed in claim 15,
wherein the external lighting device further comprises:
  a second light configured to emit pulsed light into the surroundings, and
  a sensor configured to capture the pulsed light and provide sensor data describing a time of flight of the pulsed light emitted by the second light, reflected by at least one object, and captured by the sensor,
wherein the first deflection structure of the external light input region is configured to couple the pulsed light emitted by the second light and reflected by the at least one object into the carrier medium,
wherein the carrier medium includes a sensor output coupling region embodied as a third holographic element with a third deflection structure and is configured to transmit the pulsed light to be incident on and coupled by the external light input region to the sensor output coupling region by internal reflection, the sensor output coupling region being configured to couple the pulsed light out of the carrier medium and into the sensor, so that a processor configured to evaluate the sensor data, is to provide distance data describing a distance between an object of the at least one object and a capturing device of the at least two capturing devices.

18. The motor vehicle as claimed in claim 17,
wherein the carrier medium further includes
  a light source input region embodied as a fourth holographic element with a fourth deflection structure to couple the pulsed light from the second light to be incident on the fourth deflection structure into the carrier medium, and
  a light source output region embodied as a fifth holographic element with a fifth deflection structure to couple the pulsed light to be incident on the fifth deflection structure out of the carrier medium and emit the pulsed light into the surroundings, and
wherein the carrier medium is configured to transmit the pulsed light from the light source input region to the light source output region by internal reflection.

* * * * *